US012238141B2

(12) United States Patent
Xu et al.

(10) Patent No.: US 12,238,141 B2
(45) Date of Patent: Feb. 25, 2025

(54) SYSTEMS AND METHODS FOR NETWORK ACCESS CONTROL USING DISTRIBUTED LEDGERS

(71) Applicant: Verizon Patent and Licensing Inc., Basking Ridge, NJ (US)

(72) Inventors: Kevin Xu, Warren, NJ (US); Mohan Palat, Shrewsbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 304 days.

(21) Appl. No.: 17/819,764

(22) Filed: Aug. 15, 2022

(65) Prior Publication Data

US 2024/0056485 A1 Feb. 15, 2024

(51) Int. Cl.
*H04L 9/40* (2022.01)
(52) U.S. Cl.
CPC .............. *H04L 63/20* (2013.01); *H04L 63/10* (2013.01)
(58) Field of Classification Search
CPC ................................ H04L 63/20; H04L 63/10
See application file for complete search history.

(56) References Cited

U.S. PATENT DOCUMENTS

| 11,729,084 | B1* | 8/2023 | Jaisawal | H04L 9/50 709/224 |
| 2015/0249540 | A1* | 9/2015 | Khalil | H04L 63/18 713/158 |
| 2019/0333059 | A1* | 10/2019 | Fallah | G06F 16/1834 |
| 2020/0051368 | A1* | 2/2020 | Pustizzi | G07F 17/329 |
| 2020/0195495 | A1* | 6/2020 | Parker | H04L 41/40 |
| 2021/0091994 | A1* | 3/2021 | Meirosu | H04W 4/24 |
| 2021/0160314 | A1* | 5/2021 | Parvataneni | H04L 9/3239 |
| 2022/0029960 | A1* | 1/2022 | Vagelos | H04W 12/08 |
| 2022/0038281 | A1* | 2/2022 | King | H04L 63/126 |
| 2022/0272608 | A1* | 8/2022 | Li | H04W 8/20 |
| 2022/0337393 | A1* | 10/2022 | Chen | H04L 63/0838 |
| 2023/0189010 | A1* | 6/2023 | Muhammad | H04W 12/00 455/454 |
| 2023/0198747 | A1* | 6/2023 | Sjöberg et al. | G06Q 20/065 713/168 |
| 2023/0247094 | A1* | 8/2023 | Wang | G06F 16/182 709/217 |
| 2024/0163666 | A1* | 5/2024 | Lee | H04W 12/06 |

* cited by examiner

Primary Examiner — Darshan I Dhruv

(57) ABSTRACT

A system described herein may maintain one or more smart contracts on a distributed ledger. The system may receive a request, associated with a User Equipment ("UE"), for access to a particular network (e.g., a private network), identify one or more attributes of the UE, and select a particular smart contract based on the attributes of the UE. The system may execute the selected particular smart contract, which may include performing operations, indicated by the particular smart contract, using the one or more attributes of the UE as inputs. Executing the particular smart contract may further include identifying outputs that result from performing the particular set of operations using the attributes of the UE as inputs, such as a network access policy for the UE. The system may output a response to the request, indicating the network access policy determined based on executing the particular smart contract.

20 Claims, 11 Drawing Sheets

SYSTEMS AND METHODS FOR NETWORK ACCESS CONTROL USING DISTRIBUTED LEDGERS

BACKGROUND

Wireless networks may provide wireless connectivity to User Equipment ("UEs"), such as mobile telephones, Internet of Things ("IoT") devices, autonomous vehicles, or other wireless devices. UEs may be registered, provisioned, etc. to a "home" network, which may provide wireless access to UEs that are registered with the network. Further, the UEs may "roam," which may include connecting to networks other than the home network with which such UEs are registered.

Distributed ledgers, such as blockchains, provide for the decentralized and secure storage of data. Distributed ledgers may further provide for the immutability of recorded data, as data may not be altered once recorded to a distributed ledger. The information recorded to distributed ledgers, may be visible to multiple entities, such that the entities are able to validate, approve, confirm, etc. data prior to the recordation of such data to a distributed ledger. Distributed ledgers may store smart contracts, which may include chain code, logical operators, etc. that is executable on a set of input data in order to generate a set of output data.

DETAILED DESCRIPTION OF EXAMPLE EMBODIMENTS

Figure 1A:
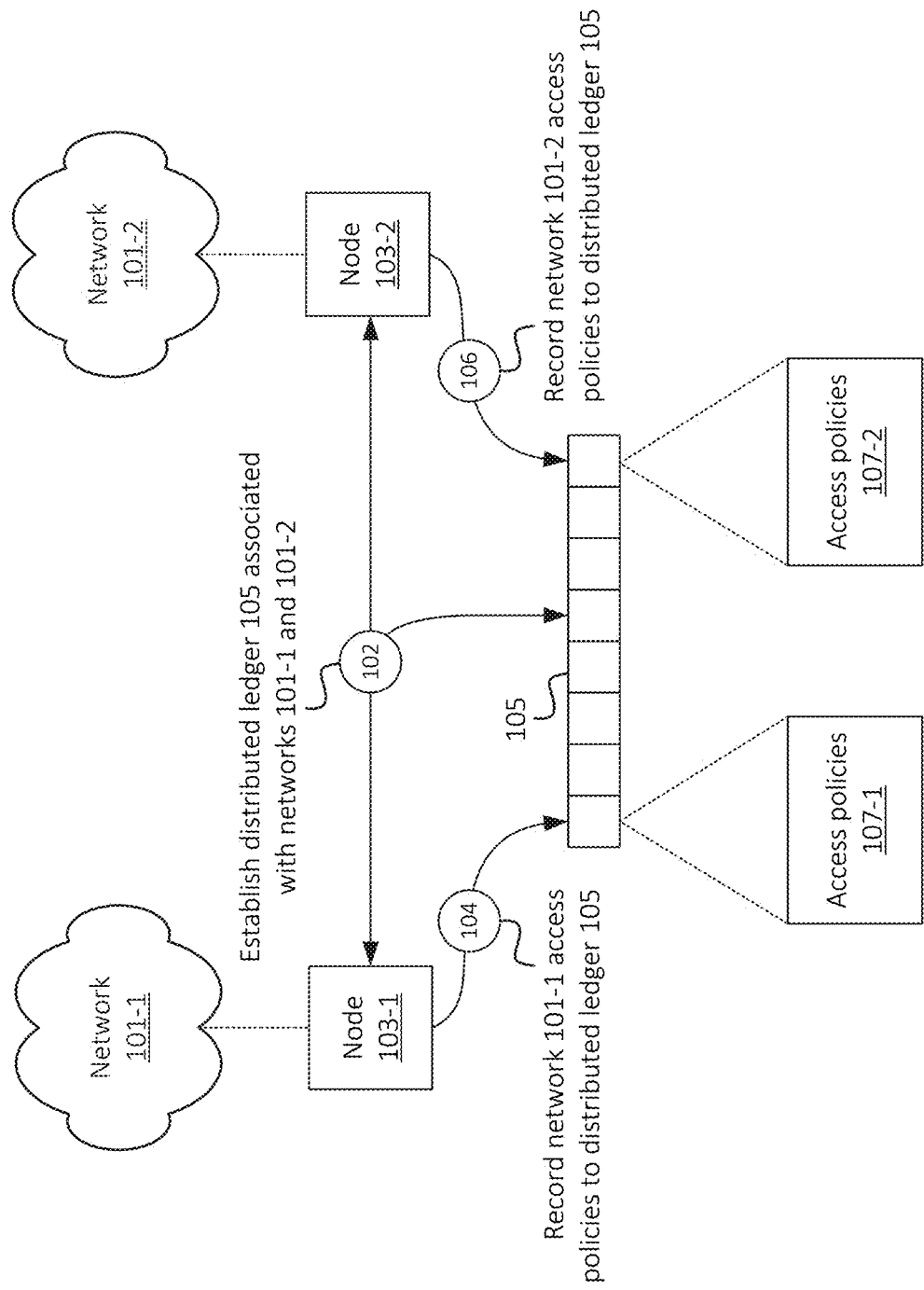
FIG. 1A illustrates an example overview of network access policies that may be recorded to a distributed ledger that is associated with multiple networks, in accordance with some embodiments.

The following detailed description refers to the accompanying drawings. The same reference numbers in different drawings may identify the same or similar elements.

Embodiments described herein provide for the use of distributed ledgers, such as blockchains, to facilitate access control associated with multiple networks, such as RANs (e.g., Long-Term Evolution ("LTE") RANs, Fifth Generation ("5G") RANs, etc.), wireless core networks (e.g., Evolved Packet Core ("EPC") networks, 5G core ("5GC") networks, etc.), or other types of networks. For example, different wireless networks may be owned or operated by separate entities (e.g., different wireless network providers, different private or public enterprises, etc.). In some embodiments, different wireless networks may be implemented using a set of shared resources. For example, a wireless network provider may implement or otherwise provide a "public" network (e.g., a public RAN, for which a first portion of RAN resources are allocated) and a "private" network (e.g., a private RAN, for which a second portion of RAN resources are allocated). In such instances, the wireless network provider may be considered as a first entity, and an administrator, institution, enterprise, etc. associated with the private network may be considered as a second entity.

As discussed herein, such different entities may maintain a distributed ledger that includes access policies associated with one or more networks (e.g., different wireless networks associated with different network operators, different private networks implemented using shared resources of one or more other networks, etc.). For example, a first network may be associated with a set of access control policies (e.g., whether to allow access to a given UE or category of UEs, times at which such access is permitted, types of traffic or services that such UE or category of UEs are authorized to communicate via the first network, etc.), and may record such access control policies to a distributed ledger that is maintained and/or is otherwise accessible to the first network and at least a second network. In some embodiments, such policies may be implemented as smart contracts on the distributed ledger. In this manner, UEs associated with the second network may be able to "roam" onto the first network, and the first network may quickly be able to identify access policies associated with the UEs, such as by executing one or more smart contracts recorded to the distributed ledger. Further, since the distributed ledger is accessible to the first network, the first network may be able to verify, validate, test, approve, etc. the access policies prior to the recordation of the access policies (e.g., the smart contracts) to the distributed ledger.

In some embodiments, as discussed below, a particular distributed ledger or "channel" may be associated with one set of networks (e.g., two, three, or more networks), while another distributed ledger or channel may be associated with a different set of networks. For example, in some embodiments, a ledger framework (e.g., the Hyperledger framework) or other type of ledger management system or ledger framework may be used to maintain such channels, such as identifiers of particular networks that are associated with particular channels. In this manner, different access control policies may be maintained for different groups of networks, which may be reflected by different roaming agreements, Service Level Agreement ("SLAs"), or the like.

As shown in FIG. 1A, for example, two example networks 101-1 and 101-2 may each be associated with one or more nodes 103-1 and 103-2, respectively. Networks 101 may be, or may include, one or more RANs, core networks, or other types of networks. As noted above, in some embodiments, networks 101-1 and 101-2 may be associated with distinct network operators and/or distinct sets of radio resources (e.g., different base stations, radios, antennas, etc.). Additionally, or alternatively, in some embodiments, networks 101-1 and 101-2 may refer to different logical portions of the same network or to different portions of a set of shared resources (e.g., radio resources or other resources).

Nodes 103 may each be implemented by one or more devices or systems, such as one or more servers, virtual machines, cloud computing systems, etc. Each respective node 103 may be communicatively coupled to one or more devices or systems of a respective network 101 (e.g., via one or more application programming interface ("APIs"), a Service Capability Exposure Function ("SCEF"), a Network Exposure Function ("NEF"), etc.), and/or may be accessed by a respective owner, operator, administrator, etc. of a given network 101 via a user interface, web portal, etc.

Nodes 103 may each be configured to or otherwise capable of communicating with one or more other nodes 103 according to one or more protocols, frameworks, etc. via which nodes 103 may establish (at 102) one or more distributed ledgers 105. For example, nodes 103 may communicate with a Hyperledger framework or some other ledger management system to establish distributed ledger 105. For example, in some embodiments, node 103-1 may provide an identifier or other information specifying network 101-2 and/or node 103-2, thus indicating that node 103-1 is requesting to establish distributed ledger 105 with node 103-2. Additionally, or alternatively, node 103-1 may communicate directly with node 103-2 in order to establish distributed ledger 105. In some embodiments, the establishment of distributed ledger 105 may include the generation of a genesis block or other initial instance of distributed ledger 105, the validation or verification of the genesis block or other initial instance of distributed ledger 105, and/or the maintaining (by nodes 103-1 and 103-2) of distributed ledger 105. In some embodiments, the establishment of distributed ledger 105 may include one or more other suitable operations.

Once distributed ledger 105 has been established, nodes 103-1 and 103-2 may operate according to one or more protocols, mechanisms, techniques, etc. to individually store a copy of distributed ledger 105, such that each node 103 maintains a separate but identical copy of distributed ledger 105. As such, distributed ledger 105 may be considered as having one state at any given time, and nodes 103-1 and 103-2 may be considered as having access to distributed ledger 105 in its current state at any given time.

The protocols, mechanisms, etc. may include authorization parameters for accessing distributed ledger 105. For example, distributed ledger 105 may be a "permissioned" or "private" ledger, to which only authorized entities have access. In this example, distributed ledger 105 may be a private ledger to which only nodes 103-1 and 103-2 have access. In examples where distributed ledger 105 is implemented or provided by a Hyperledger framework or other ledger management system, such framework or system may maintain information indicating that nodes 103-1 and 103-2 are authorized to access distributed ledger 105, but other nodes or entities are not authorized to access distributed ledger 105.

In some embodiments, the protocols, mechanisms, etc. may include consensus parameters for recordation of data to distributed ledger 105. For example, in some embodiments, distributed ledger 105 may be associated with a consensus mechanism by which data to be recorded to distributed ledger 105 is required to be approved, confirmed, etc. by all nodes 103 that maintain distributed ledger 105 before such data is recorded. As another example, distributed ledger 105 may be associated with a consensus mechanism by which data to be recorded to distributed ledger 105 is required to be approved, confirmed, etc. by one or more nodes 103 of each network 101 that is associated with distributed ledger 105 (e.g., in situations where a particular network 101 is associated with multiple nodes 103). As yet another example, distributed ledger 105 may be associated with a consensus mechanism by which data to be recorded to distributed ledger 105 is required to be approved, confirmed, etc. by a majority or other threshold quantity or proportion of nodes 103 that maintain distributed ledger 105 before such data is recorded (e.g., in situations where three or more nodes 103 are associated with the same distributed ledger 105).

Nodes 103-1 and 103-2 may each receive a set of access policies associated with respective networks 101-1 and 101-2. For example, as discussed above, nodes 103-1 and 103-2 may receive such information via one or more APIs or other suitable communication pathways from one or more devices or systems of associated networks 101-1 and 101-2, and/or may receive such information via a user interface, web portal, etc. from an operator, administrator, or the like.

Nodes 103-1 and 103-2 may each record (at 104 and 106, respectively) network access policies 107-1 and 107-2 to distributed ledger 105. For example, as discussed above, the recordation (at 104) of access policies 107-1 associated with network 101-1 may be proposed, submitted, etc. by node 103-1, and may be approved, validated, etc. by node 103-2 prior to the recordation (at 104) of such access polices to distributed ledger 105. Similarly, the recordation (at 106) of access policies 107-2 associated with network 101-2 may be proposed, submitted, etc. by node 103-2, and may be approved, validated, etc. by node 103-1 prior to the recordation (at 106) of such access polices to distributed ledger 105. In this manner, as noted above, each network 101 may be able to examine, test, analyze, validate, etc. such access policies prior to their recordation to distributed ledger 105.

In some embodiments, only one network 101 (e.g., network 101-1, but not network 101-2) may record network access policies 107 to distributed ledger 105. That is, even though multiple networks 101 are effectively participants in, are validators for, have access to, etc. distributed ledger 105, such distributed ledger 105 may in some situations only maintain network access policies 107 provided by one particular network 101, or fewer than all, of the multiple networks 101.

In some embodiments, network access policies 107 may include mapping information, lookup tables, or other information that may be used to specify access policies for UEs that access, or attempt to access, respective networks 101. For example, as discussed below, a particular UE that is associated with network 101-1 (e.g., is registered to network 101-1 as its "home" network) may attempt to access network 101-2 (e.g., may be "roaming" with respect to network 101-2), and network 101-2 may utilize network access policies 107-2 when determining whether to grant access to the UE and/or to what extent to grant access to the UE.

Figure 1B:
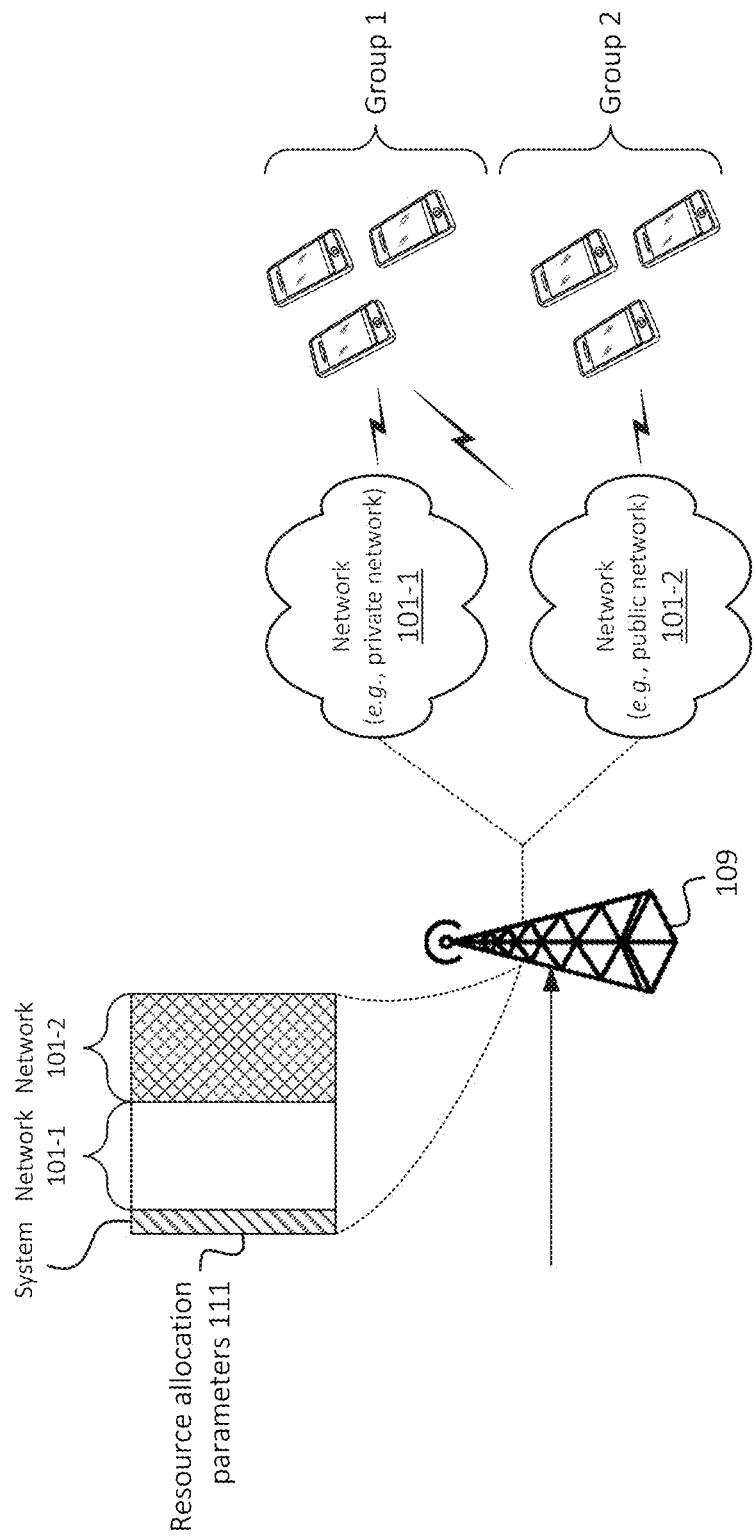
FIG. 1B illustrates an example configuration of multiple networks that are implemented using shared hardware radio equipment and resources.

As noted above, networks 101-1 and 101-2 may, in some embodiments, utilize shared radio resources. For example, as shown in FIG. 1B, base station 109 may implement one or more logical networks, such as networks 101-1 and 101-2. Networks 101-1 and 101-2 may both be "private" networks, and/or one or more of network 101-1 and/or 101-2 may be a "public" network. A "private" network may refer, for example, to a network to which access is restricted to particular UEs, users, device types, or other groups or categories. A "public" network may refer, for example, to a network to which access is not restricted in such a manner. For example, in some implementations, all UEs or users associated with a network operator associated with base station 109 (e.g., an owner or operator of base station 109) may have access to the public network, while only a subset of such UEs (and/or different UEs) may have access to the private network.

In some embodiments, each network 101 may include, may be communicatively coupled to, and/or may otherwise be associated with one or more core networks. For example, in some embodiments, network 101-1 may be or may include a first core network (e.g., a core network associated with one particular network operator), while network 101-2 may be or may include a second core network (e.g., a core network associated with a different particular network operator, or a different core network associated with the same particular network operator). In some embodiments, base station 109 and/or networks 101 may implement one or more standards, APIs, protocols, etc. such as a Multi-Operator Core Network ("MOCN") standard, that facilitate the coupling of a particular base station 109 or other radio equipment with different core networks.

For example, a first group of UEs (e.g., "Group 1 UEs") may have access to network 101-1, and a second group of UEs (e.g., "Group 2 UEs") may not have access to network 101-1. In such an example, network 101-1 may be a private network to which Group 1 UEs have access, where such access is based on UE identifiers (e.g., Subscription Permanent Identifier ("SUPI") values, International Mobile Station Equipment Identity ("IMEI") values, Mobile Directory Numbers ("MDNs"), or other suitable identifiers), device type, and/or other suitable criteria or access control mechanisms. Similarly, network 101-2 may be a network to which Group 2 UEs have access, while Group 1 UEs are unable (e.g., are not authorized) to access network 101-2. As another example, network 101-1 may be a private network that Group 1 UEs are able to access and Group 2 UEs are not able to access, while network 101-2 may be a public network that Group 1 UEs and Group 2 UEs are able to access. For example, in the event that network 101-1 becomes congested or otherwise does not allow Group 1 UEs to connect to network 101-1, Group 1 UEs may connect to network 101-2.

In some implementations, network 101-1 may be a private network with a particular set of Service Level Agreements ("SLAs"), QoS parameters, priority levels, etc., via which performance of traffic or services provided via network 101-1 may be higher (e.g., lower latency, higher throughput, etc.) than performance provided via network 101-2. For example, network 101-2 may be a public network, may be associated with "best effort" service, and/or may otherwise be associated with a lower level of performance than network 101-1.

Resource allocation parameters 111 may include, for example, parameters relating to discrete amounts of RF resources (e.g., resource elements ("REs"), Physical Resource Blocks ("PRBs"), etc.) or other resources to allocate to respective networks 101-1 and 101-2. For example, resource allocation parameters 111 may specify a first set of resources for system communications (e.g., broadcasts such as System Information Blocks ("SIBs"), Master Information Blocks ("MIBs"), etc.), a second set of resources for network 101-1, and a third set of resources for network 101-2.

As discussed below, distributed ledger 105 may be used to maintain access policy information based on which particular UEs may be granted or denied access to network 101-1 and/or 101-2.

Figure 2:
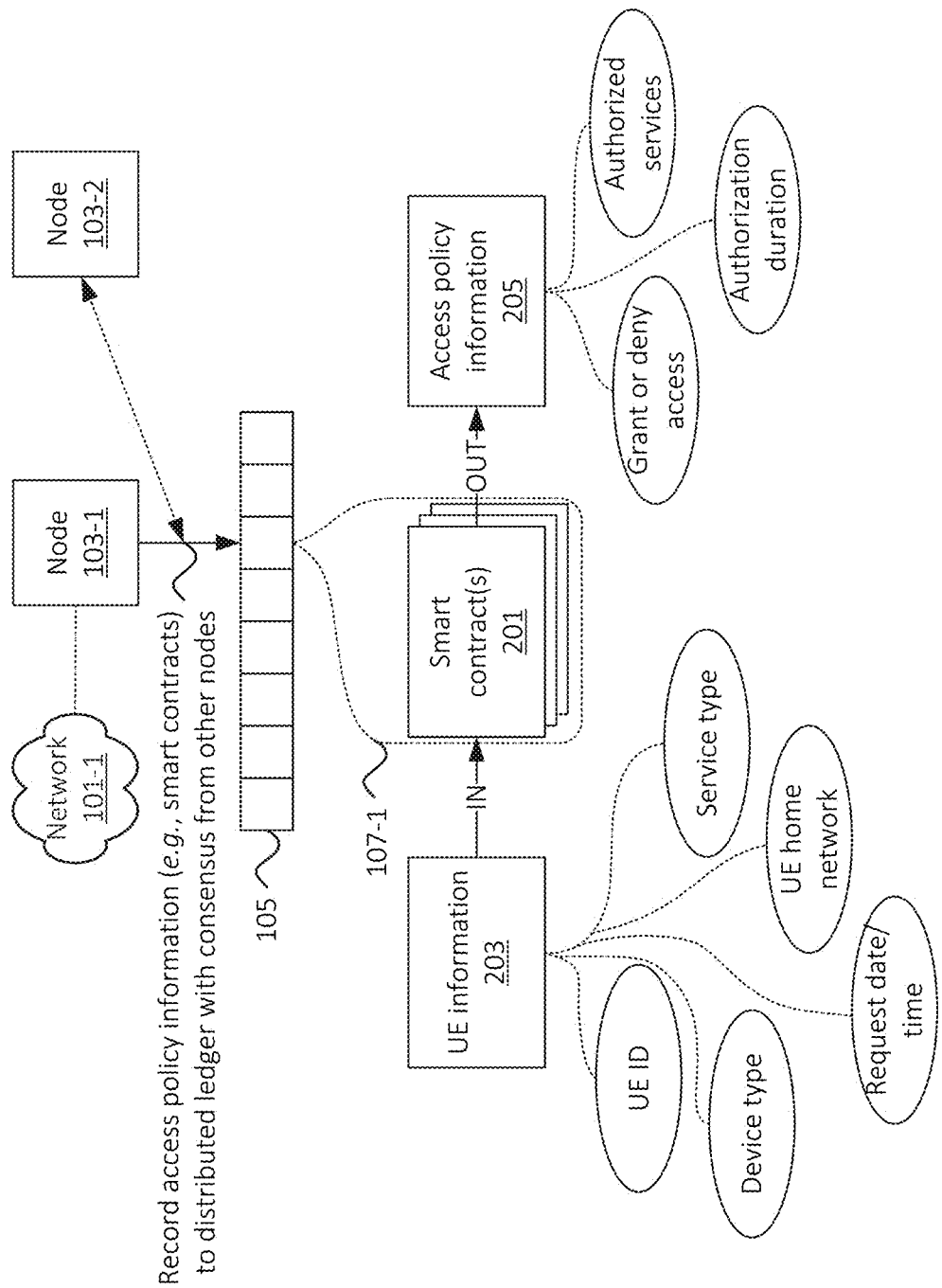
FIG. 2 illustrates an example set of network access policies recorded to a distributed ledger, in accordance with some embodiments.

In some embodiments, network access policies 107 (e.g., as maintained via distributed ledger 105) may each be, or may include, one or more smart contracts. For example, as shown in FIG. 2, node 103-1 may record network access policies 107-1 to distributed ledger 105, where node 103-2 may have validated, verified, and/or otherwise provided consensus for the recordation of network access policies 107-1 to distributed ledger 105. As shown, network access policies 107-1 may include one or more smart contracts 201, where each smart contract 201 defines a set of inputs, one or more operations to perform on the set of inputs, and a set of outputs that are provided as a result of performing the one or more operations on the set of inputs. For example, one or more smart contracts 201 may specify UE information 203 as input (e.g., may specify one or more input variables that each relate to one or more items of information regarding a given UE or set of UEs), and access policy information 205 as output. Generally, the inputs provided to smart contracts 201 may be associated with one or more UEs that are requesting access to a network (e.g., network 101-1 associated with node 103-1), and one or more smart contracts 201 may specify one or more operations that may be performed in order to determine whether such UEs should be granted access to the network and/or to what extent such UEs should be granted access to the network.

Examples of UE information 203 are provided below and in FIG. 2. In practice, UE information 203 may include additional or different UE information. UE information 203 may include, for example, one or more UE identifiers, such as SUPI values, Globally Unique Temporary Identifier ("GUTI") values, International Mobile Subscriber Identity ("IMSI") values, IMEI values, MDN values, Internet Protocol ("IP") addresses, or other suitable UE identifiers. In some embodiments, the UE identifiers may include group identifiers, categories, etc., such as "enterprise," "first responder," "Group A," "Group B," etc. For example, a UE requesting access to network 101-1 may provide its SUPI, GUTI, IMSI, group identifier, etc.

As another example, UE information 203 may include one or more service types, such as voice services, gaming services, content streaming services, augmented reality ("AR") services, etc. In some embodiments, UE information 203 may include one or more device types, such as mobile telephone, manufacturing robot, autonomous vehicle, IoT device, sensor, etc. UE information 203 may additionally, in some embodiments, include an identifier of a home network with which a UE is associated. Such identifier may be a network name, an identifier or name of a wireless network provider associated with the home network, a Public Land Mobile Network ("PLMN") identifier, or other suitable identifier. In some embodiments, UE information 203 may include one or more other types of UE information 203, that may be provided by a UE when the UE is requesting access to a given network 101. UE information 203 may include attributes of an access request itself (e.g., not necessarily specifically indicated by UEs when such UEs are requesting access), such as a date and/or time at which the request was provided, a location of a UE that provided the access request, and/or other attributes of the request.

Operations specified by smart contracts 201, associated with network access policies 107-1, may be defined or otherwise provided by node 103-1. Such operations may include, for example, performing a lookup operation, a matching operation, a hashing operation, a scoring operation, or other suitable operation on some or all input data (e.g., UE information 203) to determine network access policy information 205 based on the input data. As one example, smart contracts 201 may include static lookup tables, indicating particular UE identifiers that are authorized to access network 101-1. For example, node 103-1 (and/or some other device or system associated with network 101-1) may have received such UE identifiers from network 101-2, and may include such UE identifiers in the static lookup tables associated with one or more smart contracts 201.

For example, network 101-2 may have provided a list of UE identifiers associated with network 101-2 (e.g., identifiers of UEs for which network 101-2 is a "home" network), and smart contract 201 may maintain information associating such UE identifiers with network 101-2. In some embodiments, smart contract 201 may include a unique identifier for network 101-2, such that the UE identifiers are associated with the unique identifier for network 101-2. The unique identifier of network 101-2 may be different from, and/or may be in a different format than, a "native" network identifier used by network 101-2. For example, network 101-2 may use a Closed Subscriber Groups ("CSG") identifier, a Shared Home Network Identifier ("SHNI"), an Intent-Based Networking ("IBN") identifier, a proprietary identifier, and/or some other type of identifier. In some situations, different networks (e.g., different private networks) may utilize the same identifier. For example, in situations where two private networks are implemented using shared resources of a public network, the two private networks may utilize the same PLMN identifier (e.g., where the PLMN identifier refers to hardware resources of the public network). As another example, two private networks may, through happenstance or coincidence, end up using the same proprietary identifier. In such situations, maintaining a unique identifier on distributed ledger 105 (e.g., as implemented via one or more smart contracts 201) for each network 101 may avoid ambiguity when handling access requests, and may further serve to maintain separation between respective access policies associated with different networks 101.

In some embodiments, the unique identifier associated with each respective network 101 may include a type code that indicates a type, characteristic, tag, etc. of each network 101. As one example, a code of "01" may refer to a network used for IoT devices, a code of "02" may refer to a network implemented based on a Multi-Operator Core Network ("MOCN") standard, a code of "03" may refer to a network implemented based on a Neutral Host Network ("NHN") standard, a code of "04" may refer to a network implemented based on a Non-Public Network ("NPN") standard, etc. In some embodiments, the unique identifier for each network 101 may additionally, or alternatively, include one or more identifiers utilized and/or provided by each network 101, such as a Mobile Country Code ("MCC"), a PLMN identifier, a CSG identifier, a SHNI identifier, an IBN identifier, and/or some other suitable identifier or combination thereof. Additionally, or alternatively, the unique identifier associated with each respective network 101 may include a random or pseudorandom identifier, such that each network 101 is uniquely identified on distributed ledger 105 (e.g., via one or more smart contracts 201).

In some embodiments, smart contracts 201 may be designed, implemented, etc. such that the output of smart contracts 201 indicates that some or all of the provided UE identifiers are authorized to access network 101-1. For example, the operations specified by smart contracts 201 may include performing a hashing operation on UE identifiers provided as input, evaluating portions of UE identifiers provided as input in order to determine whether such portions match a given range or other pattern, etc. In practice, the operations specified by smart contracts 201 may be relatively complex or relatively simple.

In some embodiments, smart contracts 201 may be hierarchical, and/or certain smart contracts 201 may be applicable to particular sets of UE information 203 or values thereof. For example, a first smart contract 201 may evaluate UE information 203 provided as input to determine which parameters have been provided (e.g., UE identifier, device type, and home network, but not service type). The first smart contract 201 may include one or more operations based on which a second smart contract 201, of network access policies 107-1, is provided as output. For example, the second smart contract 201 may be configured to receive UE identifier, device type, and home network (but not service type) as inputs, and may provide an identifier (e.g., address or pointer on distributed ledger 105) indicating the second smart contract 201.

In another example, the first smart contract 201 may receive a different set of UE information 203, such as UE information 203 that includes a home network and device type of the UE, but not an identifier of the UE. In this example, the first smart contract 201 may provide, as output, an identifier of a third smart contract 201, of network access policies 107-1, that is configured to determine network access policy information 205 based on home network and device type of a given UE.

In another example, executing the first smart contract 201 may indicate different smart contracts 201 based on one or more other factors, such as request attributes. For example, executing the first smart contract 201 during a weekday may result in a fourth smart contract 201 being indicated as output (e.g., where the fourth smart contract 201 includes access policies for network 101-1 during weekdays), while executing the first smart contract 201 during a weekend may result in a fifth smart contract 201 being indicated as output. In this sense, the first smart contract 201 may serve as a "higher level" or "selector" smart contract 201 in a hierarchical arrangement of smart contracts 201 of network access policies 107-1.

Additionally, or alternatively, network access policies 107-1 may include a single smart contract 201 that may operate based on a variable set of inputs. For example, the single smart contract 201 may be used to determine network access policy information 205 in a first situation in which a first set of UE information 203 (e.g., a UE identifier and device type) is provided, and may also be used to determine network access policy information 205 in a second situation in which a second set of UE information 203 (e.g., a requested service type and a home network) is specified. The single smart contract 201 may also include operations to determine different network access policy information 205 based on different request attributes, such as different dates and/or times at which access requests were received.

Network access policy information 205 may include a binary indication as to whether access to network 101-1 is granted or denied (e.g., based on executing one or more operations associated with one or more smart contracts 201 of network access policy 107-1) for a given UE or group of UEs. In some embodiments, network access policy information 205 may include a duration of the authorized access (e.g., one hour, one day, etc.), one or more services to which the UE or group of UEs are authorized to access via network

101-1, one or more network slices of network 101-1 that the UE or group of UEs are authorized to access, and/or other attributes of access that may be granted to the UE or group of UEs.

Figure 3:
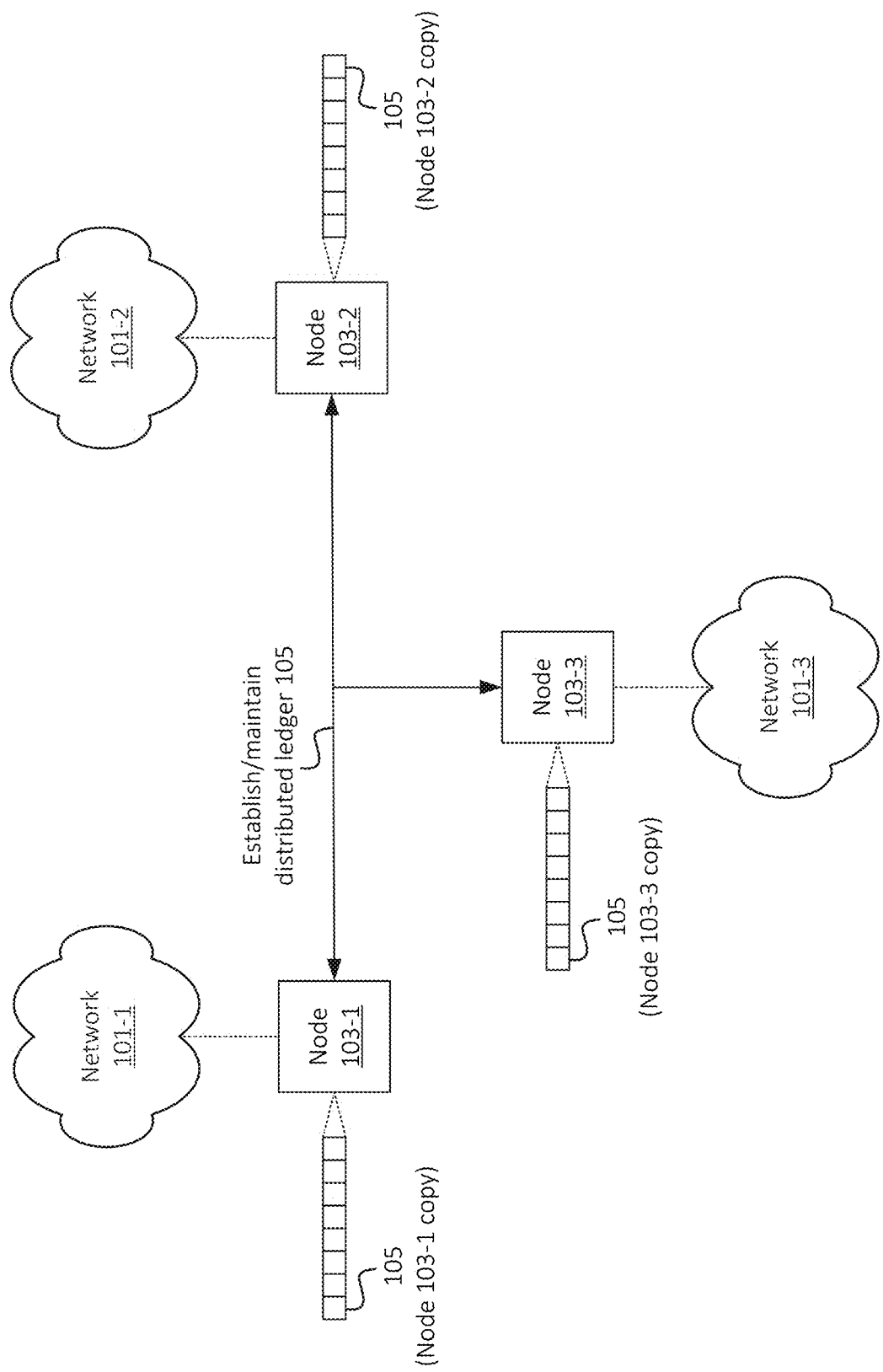
FIG. 3 illustrates an example of a distributed ledger that is associated with multiple networks, in accordance with some embodiments.

As discussed above, and as shown in FIG. 3, each node 103 that maintains a given distributed ledger 105, and/or is associated with a given channel, may maintain a local copy of distributed ledger 105. In the example of FIG. 3, three networks 101-1 through 101-3 are each associated with a respective node 103-1 through 103-3 that each maintains a local copy of distributed ledger 105. For example, each node 103 may maintain the local copy of distributed ledger 105 in an onboard storage device and/or in a cloud-based storage system.

Figure 4:
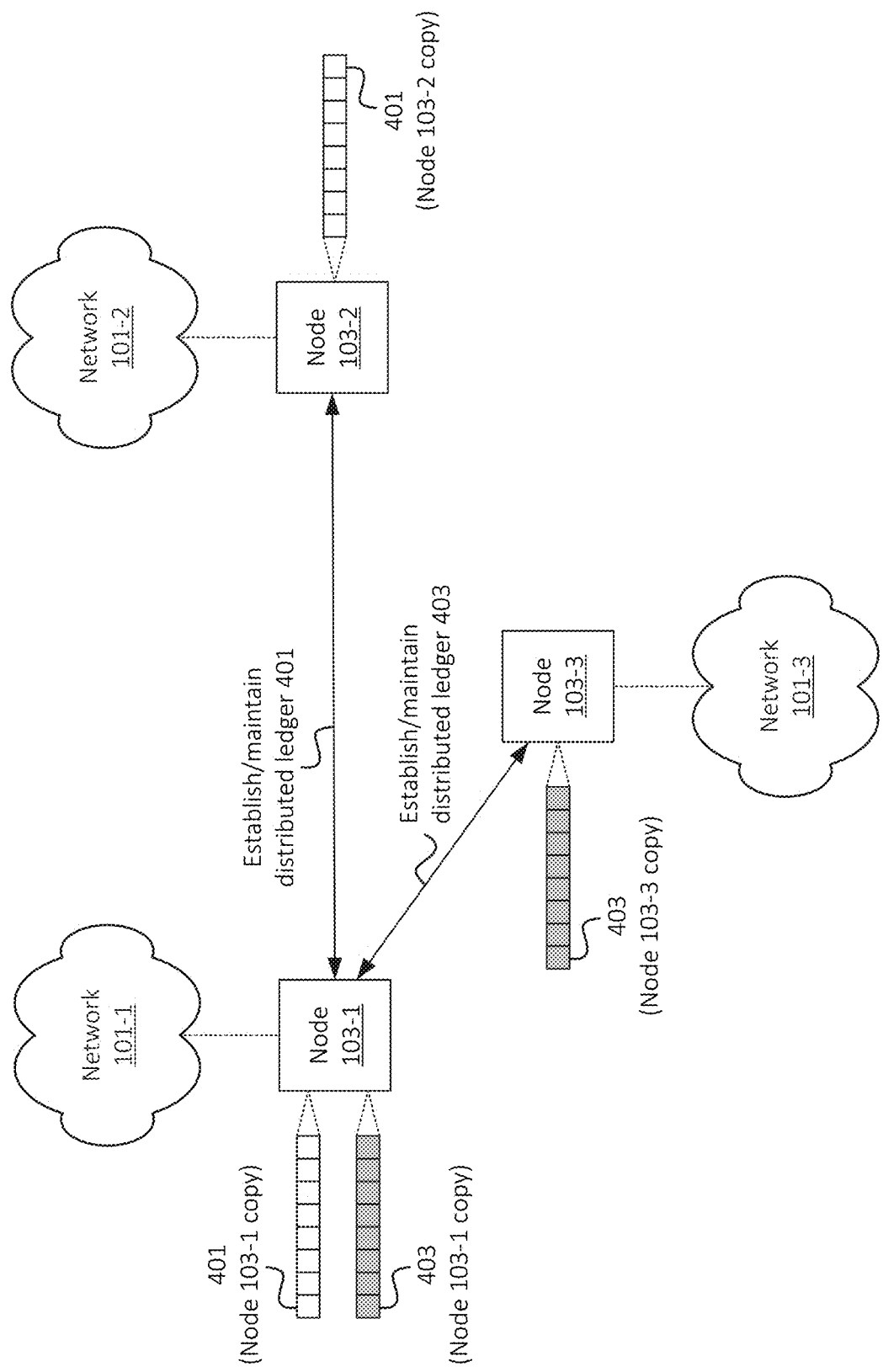
FIG. 4 illustrates an example of multiple distributed ledgers that are associated with multiple groups of networks, in accordance with some embodiments.

As also noted above, different groups of networks 101 and/or nodes 103 may be associated with distinct distributed ledgers and/or channels. For example, as shown in FIG. 4, nodes 103-1 and 103-2 may be associated with a first distributed ledger 401 (e.g., a first channel), and nodes 103-1 and 103-3 may be associated with a second distributed ledger 403 (e.g., a second channel). For example, node 103-1 may maintain a local copy of distributed ledger 401 as well as a distributed ledger 403, as node 103-1 is a participant in both distributed ledgers 401 and 403 (and/or with associated channels).

Node 103-1 may maintain information specifying criteria based on which node 103-1 may determine whether to access distributed ledger 401 or distributed ledger 403 when evaluating an access request. For example, in some embodiments, node 103-1 may maintain information indicating that distributed ledger 401 is associated with network 101-2 (e.g., is associated with a first network group that includes networks 101-1 and 101-2), and that distributed ledger 403 is associated with network 101-3 (e.g., is associated with a second network group that includes networks 101-1 and 101-3). In some embodiments, the criteria may be based on UE identifiers that are associated with each respective network 103-2 and 103-3. For example, the criteria may specify that a first set of UE identifiers are associated with network 101-2 (and therefore are associated with distributed ledger 401), and that a second set of UE identifiers are associated with network 101-3 (and are therefore associated with distributed ledger 403). In some embodiments, the criteria may be maintained separately from distributed ledgers 401 and 403. In some embodiments, distributed ledger 401 may include UE identifiers of UEs that are associated with network 101-2 (e.g., as a home network), and distributed ledger 403 may include UE identifiers of UEs that are associated with network 101-3 (e.g., as a home network).

When evaluating access requests, node 103-1 may identify a home network associated with a UE issuing such request. Additionally, or alternatively, node 103-1 may identify a network group identifier associated with the request. For example, in some situations, the UE's home network (e.g., associated with a first network identifier) and another network (e.g., associated with a second network identifier) may operate based on a mutually enforced set of policies, and/or may otherwise operate in concordance with one another. A common network group identifier associated with these networks may be used to signify a network group that includes such networks. The home network identifier, the network group identifier, and/or other suitable information may be included in, and/or may otherwise be determined based on, a request associated with a UE requesting access to core network 101-1. As similarly noted above, the network group identifier may include and/or may otherwise be based on a network type code, a network identifier (e.g., an MCC value, a PLMN identifier, a CSG identifier, a SHNI identifier, an MN identifier, and/or some other suitable identifier or combination thereof), a random or pseudorandom value, and/or some other suitable unique value. In some embodiments, the node 103-1 may identify a home network associated with a UE issuing an access request by comparing an identifier of the UE to identifiers of UEs maintained as selection criteria associated with networks 101-2 and 101-3, as discussed above. In some embodiments, node 103-1 may maintain other selection criteria or conditions based on which node 103-1 may select between using different distributed ledgers 401 or 403 for evaluating access requests.

Figure 5:
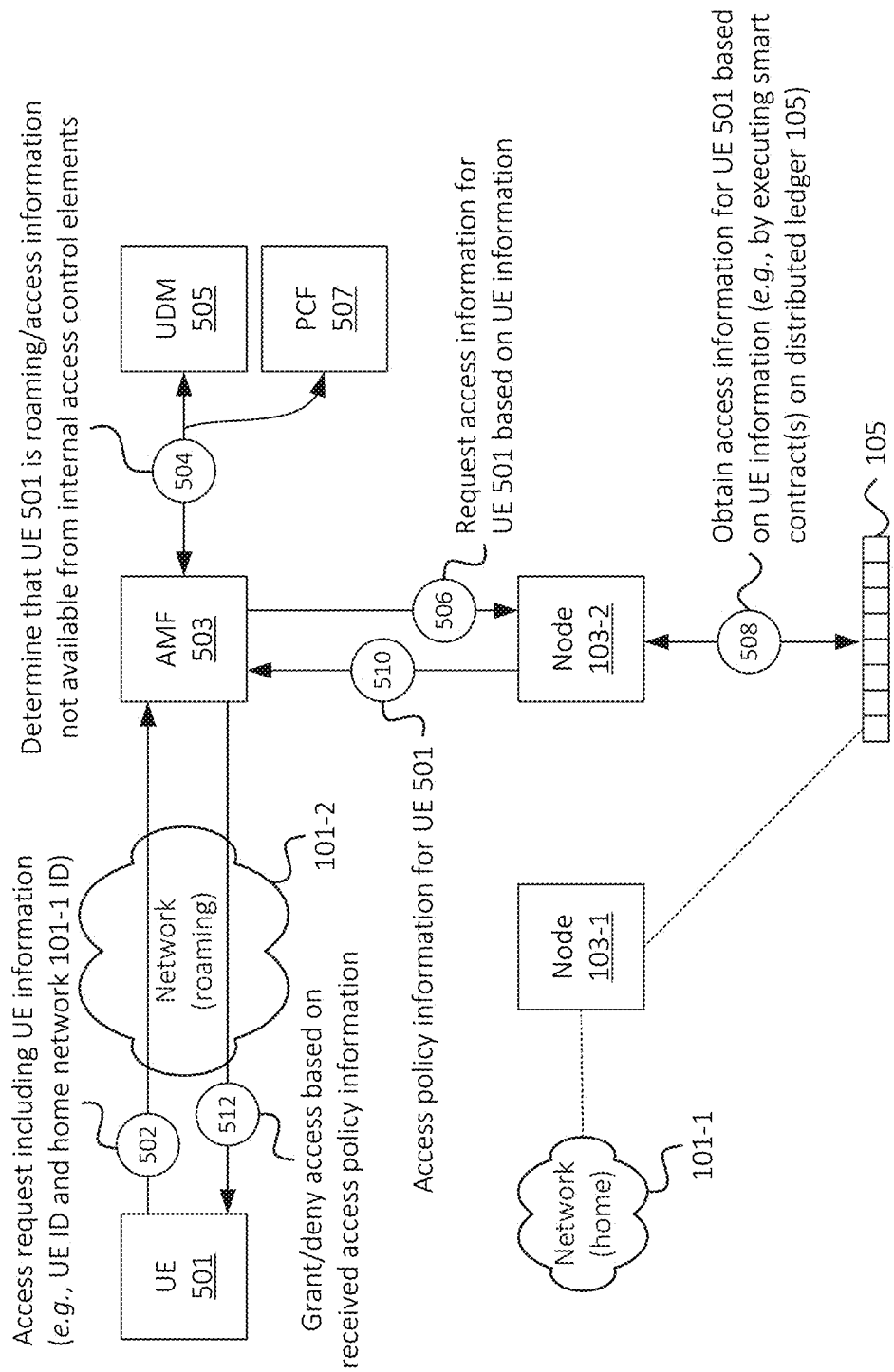
FIG. 5 illustrates an example of utilizing smart contracts recorded to a distributed ledger in order to enforce network access policies, in accordance with some embodiments.

FIG. 5 illustrates an example of distributed ledger 105 being used by a particular network 101 (i.e., network 101-2, in this example) in order to determine access policies for a particular UE 501 that is requesting access to network 101-2. In this example, UE 501 may be associated with network 101-1 as its "home" network. For example, UE 501 may maintain information, such as in a SIM ("Subscriber Identification Module") card or in some other suitable manner, identifying network 101-1 as its home network. For example, home network 101-1 may maintain, in a Unified Data Management function ("UDM"), Home Subscriber Server ("HSS"), or other suitable device or system, information regarding UE 501 and/or a user associated with UE 501. In roaming scenarios, such as when UE 501 connects with other networks, the other networks may communicate with network 101-1 in order to determine whether to grant access to UE 501. In the examples described herein, this communication between networks may be supplemented by, or replaced by, the use of distributed ledger 105 in order to identify access policies associated with UE 501 which is requesting access to network 101-2.

For example, UE 501 may output (at 502) a request for access to network 101-2, based on being geographically located within a coverage area associated with network 101-2 (e.g., within a coverage area of a RAN, a cell, a base station, etc. of network 101-2), based on approaching a coverage area associated with network 101-2, and/or based on some other suitable triggering event or condition. In some embodiments, the request for access may include UE information, such as a UE identifier (e.g., SUPI, GUTI, IMSI, MDN, etc.), an identifier of a home network of UE 501 (i.e., an identifier of network 101-1, in this example), a device type of UE 501, one or more requested services or application types (e.g., voice service or application, a content streaming service or application, etc.), one or more requested Quality of Service ("QoS") parameters (e.g., a QoS Class Identifier ("QCI"), a 5G QoS Identifier ("5QI"), etc.), one or more requested network slices (e.g., a Network Slice Selection Assistance Information ("NSSAI") value or other slice identifier), and/or other UE information. The access request may include, and/or may be a part of, a registration procedure, a session establishment procedure, and/or some other sort of communication establishment procedure between UE 501 and network 101-2 (e.g., a RAN and/or a core network of network 101-2). In this example, the access request may include a registration request that is handled by Access and Mobility Management Function ("AMF") 503 of network 101-2, which may be include Non-Access Stratum ("NAS") messaging, communications between UE 501 and AMF 503 via an N1 interface, and/or some other suitable communication pathway.

Based on receiving the access request, AMF 503 may determine (at 504) that UE 501 is roaming (e.g., is not registered to network 101-2 as its home network). For example, the request may include an indication that UE 501 is registered to a different network (i.e., network 101-1, in this example), and/or that UE 501 is otherwise roaming when requesting access to network 101-2. Additionally, or alternatively, AMF 503 may attempt to authenticate and/or determine access policies for UE 501 by communicating with user information and/or policy elements of network 101-2 (e.g., UDM 505 and/or Policy Control Function ("PCF") 507), and may determine that such elements indicate that UE 501 is roaming (e.g., is not registered to network 101-2 as its home network), that such elements do not include information associated with UE 501, and/or that such elements do not otherwise include information based on which AMF 503 may determine that UE 501 is authorized to access network 101-2.

Based on determining (at 504) that UE 501 is roaming, AMF 503 may request (at 506) access information for UE 501 from node 103-2. Although this example shows "direct" communications between AMF 503 and node 103-2, AMF 503 and node 103-2 may communicate with and/or via one or more other devices or systems. Additionally, or alternatively, AMF 503 or some other device or system accessing distributed ledger 105 may not be a node that maintains, validates, etc. distributed ledger 105. For example, an explorer or other application or entity that has access to view, read, etc. distributed ledger 105 may receive (at 506) the request from AMF 503. In this manner, AMF 503 may not have direct "awareness" that access information is maintained in a distributed ledger (e.g., distributed ledger 105). Additionally, or alternatively, AMF 503 may directly access distributed ledger 105. For example, if distributed ledger 105 is a permissioned or private distributed ledger, AMF 503 may be authorized to access distributed ledger 105 and may communicate with node 103-2 to access distributed ledger 105 maintained by node 103-2.

Node 103-2 may obtain (at 508) access information for UE 501 based on some or all of the UE information, which may have been provided by UE 501. Additionally, or alternatively, as noted above, the access information may be determined based on attributes of UE 501 and/or of the request, without necessarily having been provided by UE 501. For example, the access information may be determined based on a date or time of the request, a location of UE 501 when providing the request, a measure of load of network 101-2 (e.g., roaming UEs may be rejected if network 101-2 is overloaded, may be assigned to a "best effort" network slice, etc.), and/or other factors.

In some embodiments, as discussed above, node 103-2 may identify one or more smart contracts 201, previously recorded to distributed ledger 105 (e.g., as approved, validated, etc. by node 103-1 associated with home network 101-1), in order to determine whether UE 501 is authorized to access network 101-2 (and/or an extent to which UE 501 is authorized to access network 101-2). For example, node 103-2 may identify a particular smart contract 201 that specifies input parameters for which UE information is available for UE 501. For example, as discussed above, if node 103-2 has received an identifier of UE 501, a location of UE 501, and a home network of UE 501, node 103-2 may identify a particular smart contract 201 that specifies UE identifier, UE location, and UE home network as inputs. Additionally, or alternatively, as discussed above, node 103-2 may provide some or all available UE information to a top-level or selector smart contract 201, which may provide an indication of one or more other smart contracts 201 that are able to provide access policy information 205 associated with UE 501 based on the provided information. Node 103-2 may, in such an example, invoke the one or more other smart contracts 201 indicated by the top-level or selector smart contract 201 in order to identify the access policy information 205 associated with UE 501. As noted above, such access policy information 205 may include a binary indication of whether UE 501 is authorized to access network 101-2, one or more service or application types that UE 501 is authorized to access via network 101-2, a duration of time for which UE 501 is authorized to access network 101-2, one or more network slices that UE 501 is authorized to access via network 101-2, and/or other access parameters or policies.

Figure 6:
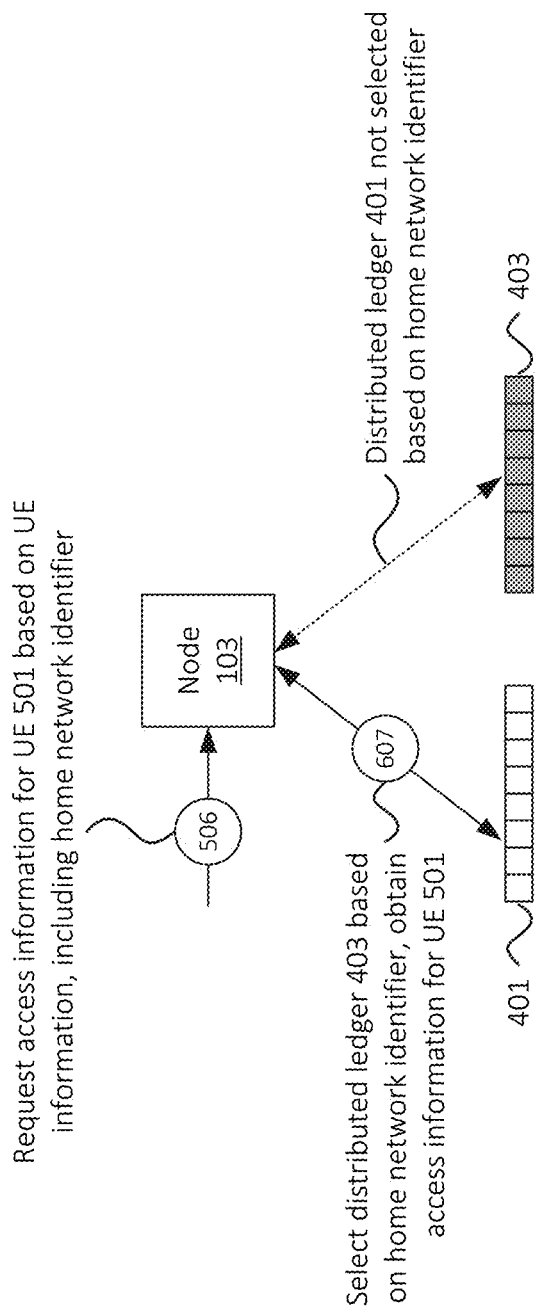
FIG. 6 illustrates an example of selecting between different distributed ledgers for a node that is associated with multiple distributed ledgers, in accordance with some embodiments.

As noted above, in some embodiments, a particular node 103 may maintain multiple distributed ledgers, which may reflect different relationships, partnerships, agreements, mutual policies, etc. with multiple sets or groups of networks 101. For example, as shown in FIG. 6, a particular node 103 may maintain different distributed ledgers 401 and 403, which may be associated with different networks 101 or groups of networks 101. When receiving (at 506) an access request for a particular UE 501, node 103 may select (at 607) one of the distributed ledgers (i.e., may select distributed ledger 401 in lieu of distributed ledger 403, in this example) based on the UE information. For example, the request may include an identifier of the home network of UE 501. Node 103 may maintain distributed ledgers 401 and 403 with information indicating that distributed ledger 401 is associated with a first network 101 (e.g., a first network identifier) and that distributed ledger 403 is associated with a second network 101 (e.g., a second network identifier). Accordingly, node 103 may select (at 607) distributed ledger 401 based on distributed ledger 401 matching a network identifier indicated in the request. In practice, other factors may be used for selecting between distributed ledgers in addition to, or in lieu of, home network identifiers. For example, different distributed ledgers may be associated with different UEs 501, different device types, etc.

Returning to FIG. 5, node 103-2 may provide (at 510) the access policy information for UE 501 to AMF 503, which may grant and/or deny (at 512) access to UE 501 based on the received access policy information 205. For example, AMF 503 may communicate with a Session Management Function ("SMF") or other suitable device or system of network 101-2 (e.g., a core of network 101-2) to facilitate or initiate the establishment of one or more communication sessions (e.g., protocol data unit ("PDU") sessions) between UE 501 and a User Plane Function ("UPF") or other suitable device or system of network 101-2. The one or more communicate sessions may be established in accordance with the network access policy information 205 determined (e.g., from distributed ledger 105) with respect to UE 501. For example, if network access policy information 205 specifies a particular network slice, the PDU session may be established via such network slice. As another example, if network access policy information 205 specifies a maximum access duration, the SMF or some other element of network 101-2 may enforce the maximum access duration (e.g., may tear down the communication session(s) between UE 501 and network 101-2 and/or may otherwise enforce the maximum access duration).

FIG. 5 is described in the context of a particular UE 501, associated with a home network 101-1, requesting access to a "roaming" network 101-2 that is separate from network 101-1. In some embodiments, similar concepts may apply in situations where UE 501, associated with home network 101-1, requests access to a private network or some other network that utilizes a set of shared resources a network 101-1. Further, while FIG. 5 is described in the context of AMF 503 determining access policy information for UE 501, in practice, one or more other types of devices or systems (e.g., node 103-2 and/or a suitable access control element) of the private network may receive a request from UE 501 and may determine (e.g., with or without consulting one or more other devices or systems, such as UDM 505 or PCF 507) that the access policy information should be obtained from distributed ledger 105. For example, as similarly discussed above, the request from UE 501 may include an identifier of the private network, and node 103-2 may identify that distributed ledger 105 maintains access policy information for the private network (and/or may identify distributed ledger 105 based on one or more other factors, as discussed above). As such, access to the private network may be granted or denied, and/or parameters of the access to the private network may be determined based on access policy information stored via distributed ledger 105 in a manner similarly discussed above.

Figure 7:
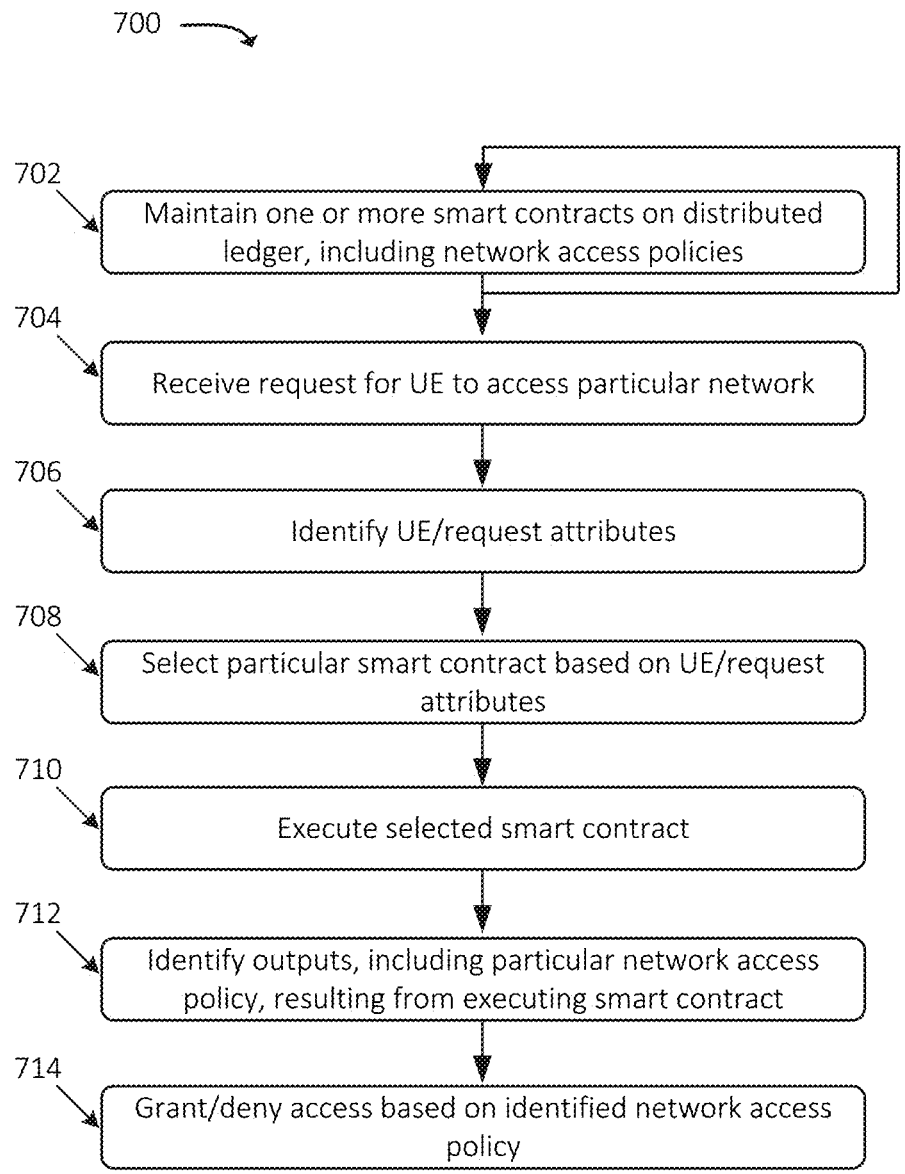
FIG. 7 illustrates an example process for utilizing smart contracts recorded to a distributed ledger in order to enforce network access policies, in accordance with some embodiments.

FIG. 7 illustrates an example process 700 for utilizing smart contracts recorded to a distributed ledger in order to enforce network access policies. In some embodiments, some or all of process 700 may be performed by a particular node 103. In some embodiments, one or more other devices may perform some or all of process 700 in concert with, and/or in lieu of, node 103.

As shown, process 700 may include maintaining (at 702) one or more smart contracts 201 on a distributed ledger 105. Smart contract(s) 201 may include, may represent, and/or may otherwise be used to indicate network access policies. For example, as discussed above, smart contract(s) 201 may specify one or more operations to perform on a given set of inputs, such as UE information 203, request attributes (e.g., time and/or date of an access request), and/or other information (e.g., network load information, information regarding predicted or scheduled events at a particular location that receives wireless coverage from the network, etc.). The operations may include lookup operations, hashing operations, logical operations, and/or other suitable operations that result in a particular set of network access policies being returned as output based on a given set of input data.

Generally, for example, the output of a given smart contract 201 may indicate whether a particular UE 501 is authorized to access a particular network 101. In some embodiments, other more granular, detailed, or conditional information may be provided, such as whether UE 501 is authorized to access network 101 under a given set of conditions (e.g., based on current or predicted network load conditions), for a particular service type, during a particular time period, etc.

In some embodiments, distributed ledger 105 may be maintained by multiple nodes 103 that are multiple networks 101. In this manner, each network 101 may have access to network policies maintained in distributed ledger 105, and may be able to reliably predict or determine whether and/or what type of roaming access will be provided to UEs 501 when roaming into other networks 101. Further, the policies maintained in distributed ledger 105 may be updated or modified over time, such as via an artificial intelligence/machine learning ("AUML") procedure, a manual procedure, a programmatic procedure, and/or in some other manner. When modifications to the network access policies (e.g., as implemented via one or more smart contracts 201) are made or proposed, other nodes 103 (e.g., associated with other networks 101) may have the opportunity to approve, test, verify, validate, etc. such policies prior to their recordation to distributed ledger 105. As such, unauthorized changes to the network access policies may be difficult or impossible, thereby preventing tampering or other malicious modifications to such network access policies.

Process 700 may further include receiving (at 704) a request for a particular UE 501 to access a particular network 101. For example, node 103 may receive such a request from AMF 503 and/or some other access control element of a network.

Process 700 may additionally include identifying (at 706) UE and/or request attributes. For example, the request may include UE information 203, and/or UE information 203 may be able to be otherwise determined based on information included in the request. In some embodiments, the request may include an identifier of a home network with which UE 501 is registered. In some embodiments, the request may include an identifier of UE 501 (e.g., a SUPI, a GUTI, an IMSI, an MDN, etc.). Node 103 may also identify one or more attributes, such as a date and/or time that the request was outputted by UE 501 and/or received by AMF 503, a measure of network load associated with network 101, and/or other suitable attributes or characteristics of UE 501, the request, and/or network 101.

Process 700 may also include selecting (at 708) a particular smart contract 201 based on the identified UE and/or request attributes. For example, in some embodiments, smart contracts 201 may include a hierarchical arrangement, in which a top-level or higher-level smart contract 201 serves as a selector that indicates which smart contract(s) 201 may be used to provide network access policy information for UE 501 having the particular set of attributes (e.g., UE identifier, home network identifier, device type, etc.) and/or under certain conditions (e.g., the particular time of day, a current or predicted measure of network load, etc.). As another example, different smart contracts 201 may be associated with different home networks, different UE device types, different requested service types, etc. In some embodiments, distributed ledger 105 may include one particular smart contract 201, which may itself include a full set of operations that result in the providing of network access policy information for UE 501.

Process 700 may further include executing (at 710) the selected smart contract 201. For example, node 103 and/or some other suitable device or system may perform the operations, indicated in the selected smart contract 201, using some or all of the identified request attributes or other factors as inputs.

Process 700 may additionally include identifying (at 712) outputs resulting from executing the selected smart contract 201. For example, the outputs may specify whether UE 501 is authorized to access network 101, a duration of the access, one or more traffic types that UE 501 is authorized to access via network 101, and/or other suitable network access policy information. In situations where the output of the selected smart contract 201 is an identification of one or more other smart contracts 201, node 103 may proceed to execute the identified smart contracts 201. For example, as discussed above, smart contracts 201 may be designed or arranged in a hierarchical manner, such that executing a sequence of smart contracts 201 may result in the network access policy information for UE 501 being provided.

Process 700 may further include granting and/or denying (at 714) access to UE 501 based on the identified network policy. For example, node 103 may indicate (e.g., to AMF 503 and/or to some other suitable device or system) that UE should or should not be granted access to network 101. In some embodiments, node 103 may indicate parameters of the granted access, such as a maximum duration, a set of authorized traffic types, etc. In this manner, AMF 503 and/or other suitable device or system may proceed with one or more communication session establishment procedures (or deny a registration or other access request) based on the network access policy information identified from distributed ledger 105.

Figure 8:
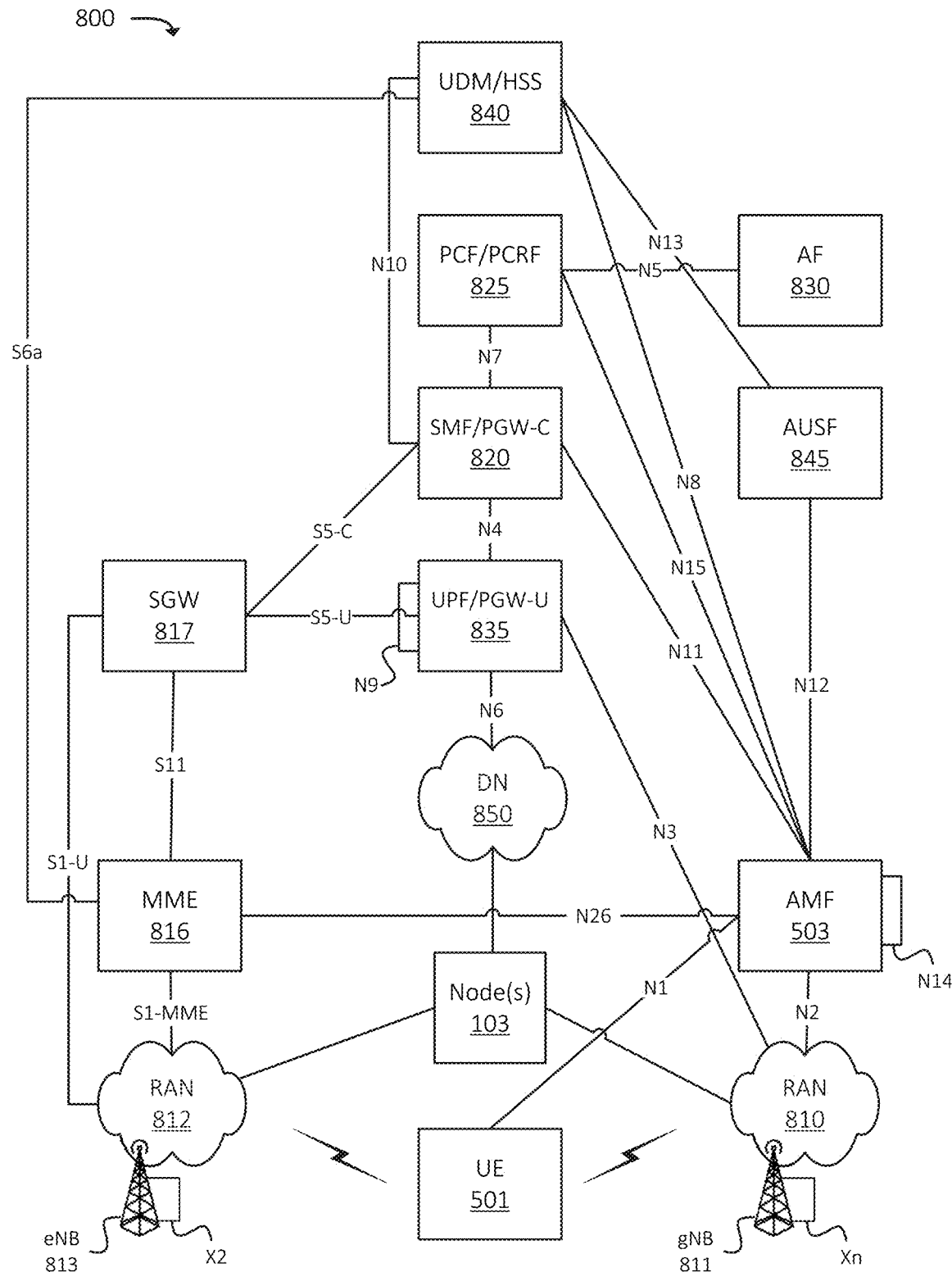
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an EPC). In some embodiments, portions of environment 800 may represent or may include a 5GC. As shown, environment 800 may include UE 501, RAN 810 (which may include one or more Next Generation Node Bs ("gNBs") 811), RAN 812 (which may include one or more evolved Node Bs ("eNBs") 813), and various network functions such as AMF 503, Mobility Management Entity ("MME") 816, Serving Gateway ("SGW") 817, SMF/Packet Data Network ("PDN") Gateway ("PGW")-Control plane function ("PGW-C") 820, PCF/Policy Charging and Rules Function ("PCRF") 825, Application Function ("AF") 830, UPF/PGW-User plane function ("PGW-U") 835, UDM/Home Subscriber Server ("HSS") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850).

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF/PGW-C 820, PCF/PCRF 825, UPF/PGW-U 835, UDM/HSS 840, and/or AUSF 845, while another slice may include a second instance of SMF/PGW-C 820, PCF/PCRF 825, UPF/PGW-U 835, UDM/HSS 840, and/or AUSF 845). The different slices may provide differentiated levels of service, such as service in accordance with different QoS parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 501 may include a computation and communication device, such as a wireless mobile communication device that is capable of communicating with RAN 810, RAN 812, and/or DN 850. UE 501 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 501 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 501 may communicate with one or more other elements of environment 800. UE 501 may communicate with RAN 810 via an air interface (e.g., as provided by gNB 811). For instance, RAN 810 may receive traffic (e.g., voice call traffic, data traffic, messaging traffic, signaling traffic, etc.) from UE 501 via the air interface, and may communicate the traffic to UPF/PGW-U 835, and/or one or more other devices or networks. Similarly, RAN 810 may receive traffic intended for UE 501 (e.g., from UPF/PGW-U 835, AMF 503, and/or one or more other devices or networks) and may communicate the traffic to UE 501 via the air interface. In some embodiments, base station 109 may be, may include, may be implemented by, and/or may be communicatively coupled to gNB 811.

RAN 812 may be, or may include, a LTE RAN that includes one or more base stations (e.g., one or more eNBs 813), via which UE 501 may communicate with one or more other elements of environment 800. UE 501 may communicate with RAN 812 via an air interface (e.g., as provided by eNB 813). For instance, RAN 812 may receive traffic (e.g., voice call traffic, data traffic, messaging traffic, signaling traffic, etc.) from UE 501 via the air interface, and may communicate the traffic to UPF/PGW-U 835, and/or one or more other devices or networks. Similarly, RAN 812 may receive traffic intended for UE 501 (e.g., from UPF/PGW-U 835, SGW 817, and/or one or more other devices or networks) and may communicate the traffic to UE 501 via the air interface. In some embodiments, base station 109 may be, may include, may be implemented by, and/or may be communicatively coupled to eNB 813.

AMF 503 may include one or more devices, systems, Virtualized Network Functions ("VNF s"), Cloud-Native Network Functions ("CNF s"), etc., that perform operations to register UE 501 with the 5G network, to establish bearer channels associated with a session with UE 501, to hand off UE 501 from the 5G network to another network, to hand off UE 501 from the other network to the 5G network, manage mobility of UE 501 between RANs 810 and/or gNBs 811, and/or to perform other operations. In some embodiments, the 5G network may include multiple AMFs 503, which communicate with each other via the N14 interface (denoted in FIG. 8 by the line marked "N14" originating and terminating at AMF 503).

MME 816 may include one or more devices, systems, VNFs, CNFs, etc., that perform operations to register UE 501 with the EPC, to establish bearer channels associated with a session with UE 501, to hand off UE 501 from the EPC to another network, to hand off UE 501 from another network to the EPC, manage mobility of UE 501 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SWIF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 501. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825). In some embodiments, PCF/PCRF 825 may be, may include, and/or may be implemented by PCF 507.

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 501, from DN 850, and may forward the user plane data toward UE 501 (e.g., via RAN 810, SMF/PGW-C 820, and/or one or more other devices). In some embodiments, multiple UPFs 835 may be deployed (e.g., in different geographical locations), and the delivery of content to UE 501 may be coordinated via the N9 interface (e.g., as denoted in FIG. 8 by the line marked "N9" originating and terminating at UPF/PGW-U 835). Similarly, UPF/PGW-U 835 may receive traffic from UE 501 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. AUSF 845 and/or UDM/HSS 840 may perform authentication, authorization, and/or accounting operations associated with the subscriber and/or a communication session with UE 501. In some embodiments, UDM/HSS 840 may be, may include, and/or may be implemented by PCF 507.

DN 850 may include one or more wired and/or wireless networks. For example, DN 850 may include an IP-based PDN, a wide area network ("WAN") such as the Internet, a private enterprise network, and/or one or more other networks. UE 501 may communicate, through DN 850, with data servers, other UEs 501, and/or to other servers or applications that are coupled to DN 850. DN 850 may be connected to one or more other networks, such as a public switched telephone network ("PSTN"), a PLMN, and/or another network. DN 850 may be connected to one or more devices, such as content providers, applications, web servers, and/or other devices, with which UE 501 may communicate.

Figure 9:
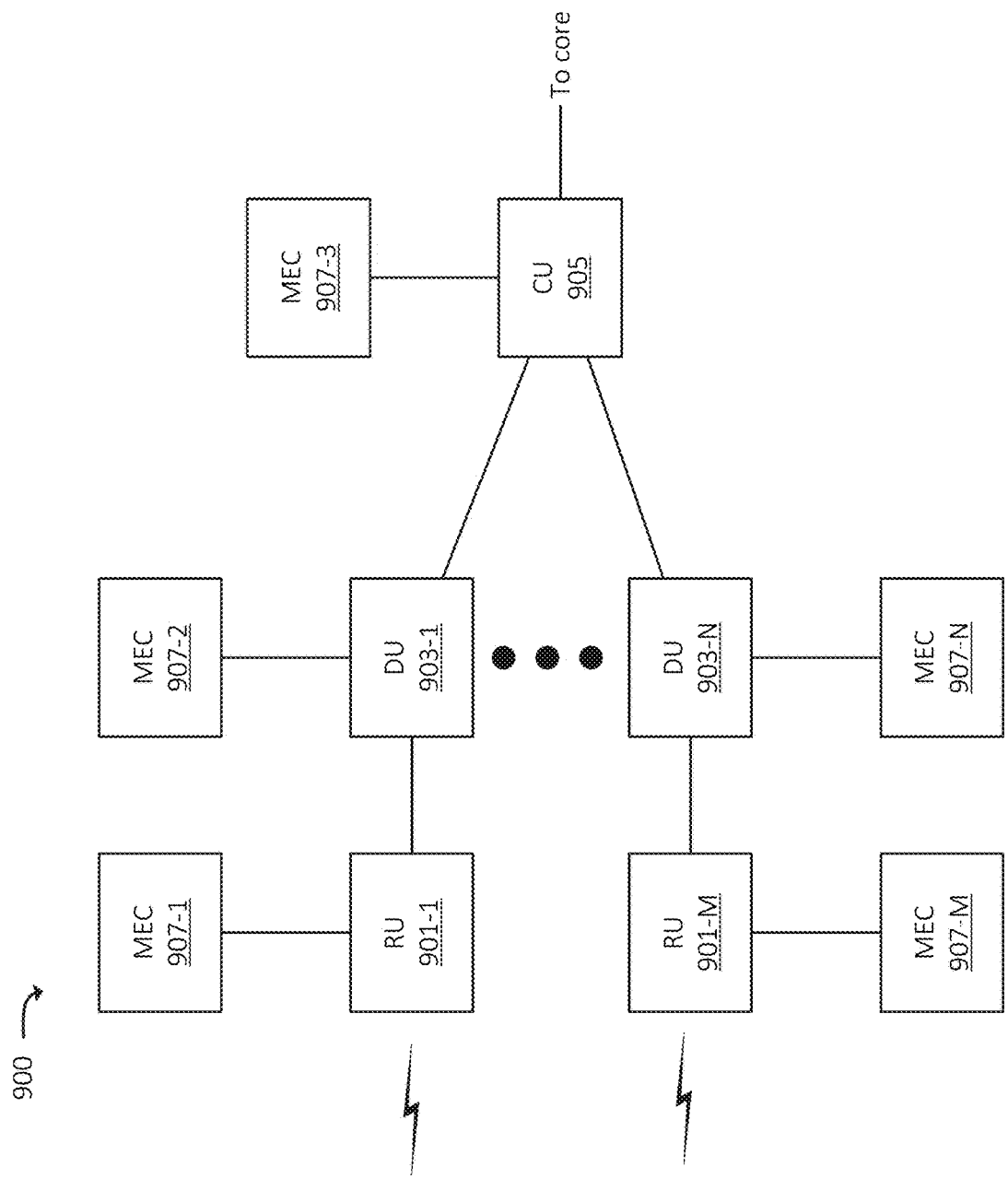
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 503 and/or UPF/PGW-U 835). In the uplink direction (e.g., for traffic from UEs 501 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 501, and may determine which DU(s) 903 should receive the downlink traffic. DU 903 may include one or more devices that transmit traffic between a core network (e.g., via CU 905) and UE 501 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 501.

RU 901 may include hardware circuitry (e.g., one or more RF transceivers, antennas, radios, and/or other suitable hardware) to communicate wirelessly (e.g., via an RF interface) with one or more UEs 501, one or more other DUs 903 (e.g., via RUs 901 associated with DUs 903), and/or any other suitable type of device. In the uplink direction, RU 901 may receive traffic from UE 501 and/or another DU 903 via the RF interface and may provide the traffic to DU 903. In the downlink direction, RU 901 may receive traffic from DU 903, and may provide the traffic to UE 501 and/or another DU 903.

RUs 901 may, in some embodiments, be communicatively coupled to one or more Multi-Access/Mobile Edge Computing ("MEC") devices, referred to sometimes herein simply as "MECs" 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 501, via a respective RU 901.

For example, RU 901-1 may route some traffic, from UE 501, to MEC 907-1 instead of to a core network via DU 903 and CU 905. MEC 907-1 may process the traffic, perform one or more computations based on the received traffic, and may provide traffic to UE 501 via RU 901-1. In some embodiments, MEC 907 may include, and/or may implement, some or all of the functionality described above with respect to one or more nodes 103, AF 830, UPF 835, and/or one or more other devices, systems, VNFs, CNFs, etc. In this manner, ultra-low latency services may be provided to UE 501, as traffic does not need to traverse DU 903, CU 905, and an intervening backhaul network between DU network 900 and the core network.

Figure 10:
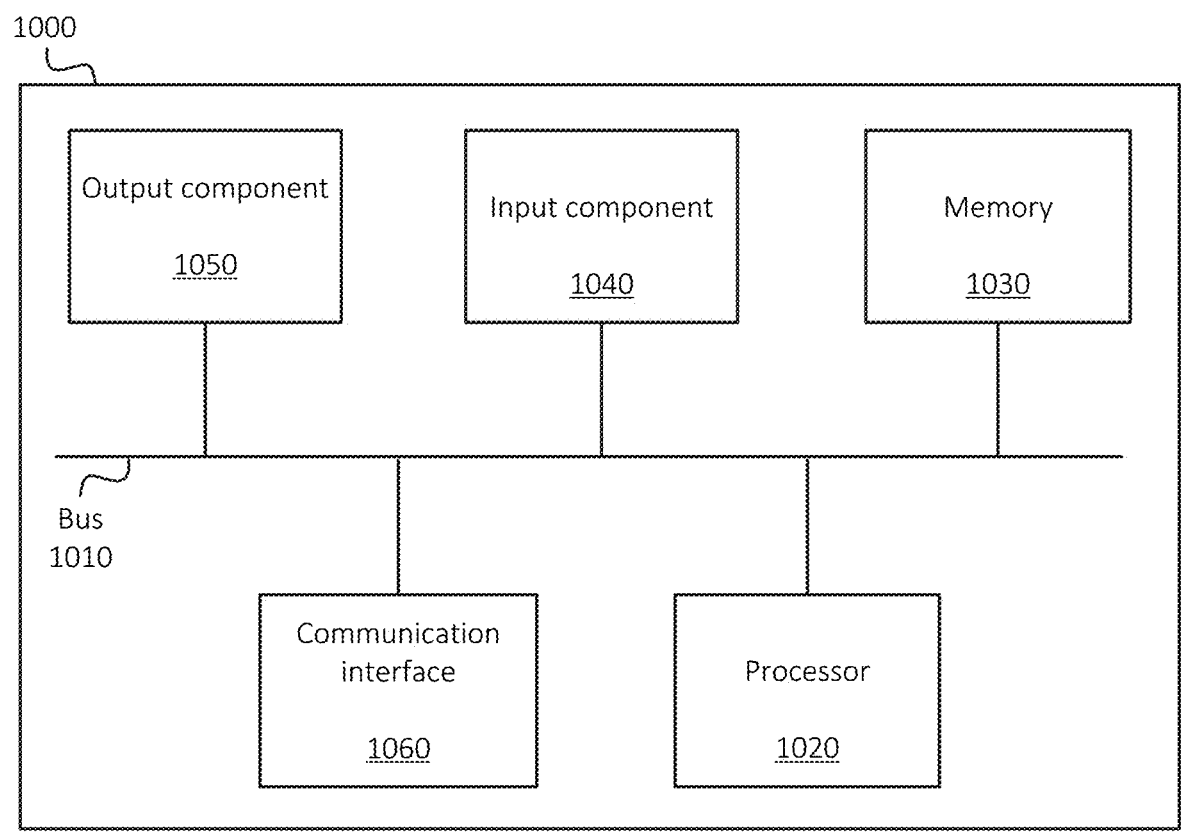
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A device, comprising:
one or more hardware processors configured to:
maintain one or more smart contracts on a distributed ledger, wherein the one or more smart contracts each indicate a set of operations to perform on a respective set of inputs, wherein the one or more smart contracts include:
a first smart contract that is associated with a first network identifier, and
a second smart contract that is associated with a second network identifier;
receive a request, associated with a User Equipment ("UE"), for access to a particular network;
identify one or more attributes of the UE or of the request, wherein identifying the one or more attributes of the UE include identifying a particular network identifier with which the UE is associated;
select a particular smart contract, of the one or more smart contracts, based on the one or more attributes of the UE or of the request, wherein selecting the particular smart contract includes:

determining that the particular network identifier, with which the UE is associated, matches the first network identifier; and
selecting the first smart contract based on determining that the particular network identifier matches the first network identifier;
execute the selected particular smart contract, wherein executing the particular smart contract includes performing a particular set of operations, indicated by the particular smart contract, using the one or more attributes of the UE or of the request as inputs,
wherein executing the particular smart contract includes identifying one or more outputs that result from performing the particular set of operations using the one or more attributes of the UE or of the request as inputs,
wherein the one or more outputs include a network access policy for the UE; and
output a response to the request, wherein the response is based on the network access policy determined based on executing the particular smart contract.

2. The device of claim 1, wherein the request is received from an access control element of a wireless network, and wherein the response is outputted to the access control element of the wireless network.

3. The device of claim 2, wherein the access control element includes an Access and Mobility Management Function ("AMF").

4. The device of claim 2, wherein the access control element includes a Mobility Management Entity ("MME").

5. The device of claim 1, wherein the distributed ledger is maintained by a plurality of nodes,
wherein a first node of the plurality of nodes is associated with the particular network, and
wherein a second node of the plurality of nodes is associated with a home network with which the UE is registered.

6. The device of claim 1, wherein the one or more attributes of the UE further include at least one of:
an identifier of a home network with which the UE is registered, or
a device type of the UE.

7. The device of claim 1, wherein the one or more attributes of the request include a time or date that the UE outputted the request.

8. A non-transitory computer-readable medium, storing a plurality of processor-executable instructions to:
maintain one or more smart contracts on a distributed ledger, wherein the one or more smart contracts each indicate a set of operations to perform on a respective set of inputs, wherein the one or more smart contracts include:
a first smart contract that is associated with a first network identifier, and
a second smart contract that is associated with a second network identifier;
receive a request, associated with a User Equipment ("UE"), for access to a particular network;
identify one or more attributes of the UE or of the request, wherein identifying the one or more attributes of the UE include identifying a particular network identifier with which the UE is associated;
select a particular smart contract, of the one or more smart contracts, based on the one or more attributes of the UE or of the request, wherein selecting the particular smart contract includes:

determining that the particular network identifier, with which the UE is associated, matches the first network identifier; and selecting the first smart contract based on determining that the particular network identifier matches the first network identifier;

execute the selected particular smart contract, wherein executing the particular smart contract includes performing a particular set of operations, indicated by the particular smart contract, using the one or more attributes of the UE or of the request as inputs, wherein executing the particular smart contract includes identifying one or more outputs that result from performing the particular set of operations using the one or more attributes of the UE or of the request as inputs, wherein the one or more outputs include a network access policy for the UE; and output a response to the request, wherein the response is based on the network access policy determined based on executing the particular smart contract.

9. The non-transitory computer-readable medium of claim 8, wherein the request is received from an access control element of a wireless network, and wherein the response is outputted to the access control element of the wireless network.

10. The non-transitory computer-readable medium of claim 9, wherein the access control element includes an Access and Mobility Management Function ("AMF").

11. The non-transitory computer-readable medium of claim 9, wherein the access control element includes a Mobility Management Entity ("MME").

12. The non-transitory computer-readable medium of claim 8, wherein the distributed ledger is maintained by a plurality of nodes, wherein a first node of the plurality of nodes is associated with the particular network, and wherein a second node of the plurality of nodes is associated with a home network with which the UE is registered.

13. The non-transitory computer-readable medium of claim 8, wherein the one or more attributes of the UE further include at least one of:

an identifier of a home network with which the UE is registered, or a device type of the UE.

14. The non-transitory computer-readable medium of claim 8, wherein the one or more attributes of the request include a time or date that the UE outputted the request.

15. A method, comprising:

maintaining one or more smart contracts on a distributed ledger, wherein the one or more smart contracts each indicate a set of operations to perform on a respective set of inputs, wherein the one or more smart contracts include:

a first smart contract that is associated with a first network identifier, and a second smart contract that is associated with a second network identifier;

receiving a request, associated with a User Equipment ("UE"), for access to a particular network;

identifying one or more attributes of the UE or of the request, wherein identifying the one or more attributes of the UE include identifying a particular network identifier with which the UE is associated;

selecting a particular smart contract, of the one or more smart contracts, based on the one or more attributes of the UE or of the request, wherein selecting the particular smart contract includes:

determining that the particular network identifier, with which the UE is associated, matches the first network identifier; and selecting the first smart contract based on determining that the particular network identifier matches the first network identifier;

executing the selected particular smart contract, wherein executing the particular smart contract includes performing a particular set of operations, indicated by the particular smart contract, using the one or more attributes of the UE or of the request as inputs, wherein executing the particular smart contract includes identifying one or more outputs that result from performing the particular set of operations using the one or more attributes of the UE or of the request as inputs, wherein the one or more outputs include a network access policy for the UE; and outputting a response to the request, wherein the response is based on the network access policy determined based on executing the particular smart contract.

16. The method of claim 15, wherein the request is received from an Access and Mobility Management Function ("AMF") of a wireless network, and wherein the response is outputted to the AMF.

17. The method of claim 15, wherein the distributed ledger is maintained by a plurality of nodes, wherein a first node of the plurality of nodes is associated with the particular network, and wherein a second node of the plurality of nodes is associated with a home network with which the UE is registered.

18. The method of claim 15, wherein the one or more attributes of the UE further include at least one of:

an identifier of a home network with which the UE is registered, or a device type of the UE.

19. The method of claim 15, wherein the one or more attributes of the request include a time or date that the UE outputted the request.

20. The method of claim 15, wherein the request is received from a Mobility Management Entity ("MME") of a wireless network, and wherein the response is outputted to the MME.

* * * * *